US012633860B2

(12) United States Patent
Ngu et al.

(10) Patent No.: US 12,633,860 B2
(45) Date of Patent: May 19, 2026

(54) SYSTEM AND METHOD FOR CONTROLLING A MULTI-PHASE POWER INVERTER OF AN ELECTRIC MACHINE

(71) Applicant: GM GLOBAL TECHNOLOGY OPERATIONS LLC, Detroit, MI (US)

(72) Inventors: Benjamin S. Ngu, Royal Oak, MI (US); Michael Z. Pieszala, Panama City, FL (US); Khorshed Mohammed Alam, Canton, MI (US); Yilun Luo, Ann Arbor, MI (US); Muhammad Hussain Alvi, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 226 days.

(21) Appl. No.: 18/634,568

(22) Filed: Apr. 12, 2024

(65) Prior Publication Data

US 2025/0323593 A1 Oct. 16, 2025

(51) Int. Cl.
*H03K 5/04* (2006.01)
*H02P 27/08* (2006.01)

(52) U.S. Cl.
CPC .................................... *H02P 27/08* (2013.01)

(58) Field of Classification Search
CPC ........................................................ H02P 27/08
See application file for complete search history.

(56) References Cited

U.S. PATENT DOCUMENTS

| | | | | |
|---|---|---|---|---|
| 10,495,050 | B2* | 12/2019 | Alpe .................... | H03K 17/163 |
| 2018/0212545 | A1 | 7/2018 | Xu et al. | |
| 2022/0263404 | A1 | 8/2022 | Volke et al. | |
| 2022/0416782 | A1 | 12/2022 | Akiyama et al. | |
| 2023/0179196 | A1* | 6/2023 | Yamamoto ............. | H02M 1/08 |
| | | | | 327/109 |

FOREIGN PATENT DOCUMENTS

| | | |
|---|---|---|
| CN | 115642791 A | 1/2023 |
| DE | 10356468 A1 | 10/2004 |
| DE | 102011108495 A1 | 9/2012 |
| DE | 102013212262 A1 | 1/2014 |
| DE | 102016217494 A1 | 3/2018 |
| DE | 112017004119 T5 | 5/2019 |

(Continued)

*Primary Examiner* — Muhammad S Islam
(74) *Attorney, Agent, or Firm* — Quinn IP Law

(57) ABSTRACT

A gate drive system for a multi-phase power inverter includes a gate controller, a gate drive circuit, and a hybrid switch power module that is integrated into a phase leg of the multi-phase power inverter. The hybrid switch power module includes a first semiconductor switch connected in parallel with a second semiconductor switch. The first semiconductor switch has first performance characteristics, and the second semiconductor switch has second performance characteristics. The gate drive circuit includes a gate driver, a first variable resistance circuit, and a second variable resistance circuit. The first variable resistance circuit is powered via a first low-voltage DC power bus, and the second variable resistance circuit is powered via a second low-voltage DC power bus. The first variable resistance circuit connects to a first gate of the first semiconductor switch, and the second variable resistance circuit connects to a second gate of the second semiconductor switch.

20 Claims, 9 Drawing Sheets

(56) References Cited

FOREIGN PATENT DOCUMENTS

| | | | |
|---|---|---|---|
| DE | 112018002634 | T5 | 4/2020 |
| DE | 112018004716 | T5 | 6/2020 |
| DE | 102022119439 | A1 | 3/2023 |
| DE | 102022120996 | A1 | 2/2024 |
| EP | 0664613 | A2 | 7/1995 |
| WO | WO02052726 | A1 | 7/2002 |
| WO | WO2023079820 | A1 | 5/2023 |

* cited by examiner

66

814        ON
            OFF

816        ON
            OFF

820

T1

66

814        ON
            OFF

816        OFF

820

T2

SYSTEM AND METHOD FOR CONTROLLING A MULTI-PHASE POWER INVERTER OF AN ELECTRIC MACHINE

INTRODUCTION

The present disclosure relates to systems for controlling an electric machine. In one embodiment, this may include elements related to operating a multi-phase power inverter to provide electrical power to a traction motor of an electric vehicle.

In a power inversion process, pulse width modulation (PWM), pulse density modulation, delta-sigma modulation, pulse-frequency modulation, or other application-suitable binary (ON/OFF) switching control signals may be employed to facilitate transitions of switches between different states for purposes of powering an electric machine. The control signals, for example, may alternatingly control conducting states of the switches to convert direct current (DC) electrical power to alternating current (AC) electrical power to power the electric machine. Examples of switches used in higher power applications, such as those used for electrically powering a traction motor of an electric vehicle, may be voltage and/or current controlled devices that switch between ON and OFF states. Examples include wide band-gap (WBG), Gallium Nitride (GaN), Silicon Carbide (SiC), and other semiconductor switches, such as Metal Oxide Field Effect transistor (MOSFET) and Insulated Gate Bipolar Transistor (IGBT) semiconductor switches, which may be capable of supporting a wide variety of switching events. The rate, speed, timing, etc. of the switching events, or more specifically the transitioning of the switches between ON and OFF states (or opened and closed states), may be characterized as a slew rate. There may be benefits to having an ability to select and control the slew rate to minimize second order effects, such as overvoltage spikes, electromagnetic interference (EMI) bearing current, voltage overshoot, etc.

SUMMARY

The concepts described herein provide a system, method, and apparatus for controlling semiconductor switches including hybrid switch power modules, such as may be employed in a multi-phase power inverter. The semiconductor switches may be arranged in parallel or series, wherein the semiconductor switches have different semiconductor technologies. The first and second semiconductor switches are controlled in a manner that coordinates or synchronizes current conductions during ON/OFF transitions and OFF/ON transitions by taking into account differences in gate voltages, thus providing overcurrent protection, overvoltage protection, and simplification of pulsewidth-modulation (PWM) control of semiconductor switches of hybrid switch power modules.

This system and method provide compensation for different operating characteristics of the different technologies employed in a hybrid switch power module, such as differences in switching delays or latencies of the individual switches employed therein, to ensure the switching of the first semiconductor switch and the switching of the second semiconductor switch are synchronized so that timing of current conduction therein is equivalent during ON/OFF transients and during OFF/ON transients.

This is achieved by using a gate driver with at least two sets of gate outputs for each of the types of semiconductor switches. The gate outputs for each of the switch are operated individually, or in parallel for a total of at least three different slew rate settings per semiconductor switch type.

An aspect of the disclosure may include a gate drive system for a multi-phase power inverter that includes a gate controller, a gate drive circuit, and a hybrid switch power module, wherein the hybrid switch power module is integrated into a phase leg of the multi-phase power inverter. The hybrid switch power module includes a first semiconductor switch connected in parallel with a second semiconductor switch between one of a positive high-voltage (HV) DC power rail or a negative HV DC power rail and an AC power link of the phase leg of the multi-phase power inverter. The first semiconductor switch has a first set of performance characteristics, and the second semiconductor switch has a second set of performance characteristics that differ at least partially from the first set of performance characteristics. The gate drive circuit includes a gate driver, a first variable resistance circuit, and a second variable resistance circuit. The first variable resistance circuit is powered via a first low-voltage DC power bus, and the second variable resistance circuit is powered via a second low-voltage DC power bus. The first variable resistance circuit connects to a first gate of the first semiconductor switch, and the second variable resistance circuit connects to a second gate of the second semiconductor switch. The gate driver controls a first positive voltage level and a first negative voltage level of the first low-voltage DC power bus to control at least one of a first positive voltage level and a first negative voltage level at the first gate of the first semiconductor switch. The gate driver controls a second positive voltage level and a second negative voltage level of the second low-voltage DC power bus to control at least one of a second positive voltage level and a second negative voltage level at the second gate of the second semiconductor switch. The first positive voltage level at the first gate of the first semiconductor switch differs from the second positive voltage level at the second gate of the second semiconductor switch.

Another aspect of the disclosure may include the first negative voltage level at the first gate of the first semiconductor switch differing from the second negative voltage level at the second gate of the second semiconductor switch.

Another aspect of the disclosure may include a first controllable gate clamp, wherein the first controllable gate clamp is connected between the first gate of the first semiconductor switch and a negative rail of the first low-voltage DC power bus, and wherein the first controllable gate clamp is operable to connect the first gate of the first semiconductor switch to the negative rail of the first low-voltage DC power bus when a first control signal that is input to the first gate is less than a first threshold gate voltage.

Another aspect of the disclosure may include a second controllable gate clamp, wherein the second controllable gate clamp is connected between the second gate of the second semiconductor switch and a negative rail of the second low-voltage DC power bus; wherein the second controllable gate clamp is operable to connect the second gate of the second semiconductor switch to the negative rail of the second low-voltage DC power bus when a second control signal that is input to the second gate is less than a second threshold gate voltage.

Another aspect of the disclosure may include the first controllable gate clamp being at least one of a semiconductor switch, a resistor arranged in series with a switch, or a controlled current source arranged in series with a switch.

Another aspect of the disclosure may include a first controllable gate clamp, wherein the controllable gate clamp is connected between the first gate of the first semiconductor switch and a common rail; wherein the first controllable gate clamp is operable to connect the first gate of the first semiconductor switch to the common rail when a first control signal that is input to the first gate is less than a first threshold gate voltage.

Another aspect of the disclosure may include an over-voltage protection circuit, the overvoltage protection circuit including a transient voltage diode, a first overvoltage switch, and a second overvoltage switch; wherein the transient voltage diode connects between the positive HV DC power rail and the first gate of the first semiconductor switch via the first overvoltage switch; wherein the transient voltage diode connects between the positive HV DC power rail and the second gate of the second semiconductor switch via the second overvoltage switch; and wherein the gate driver selectively activates the first and second overvoltage switches in response to an overvoltage condition at one of the first semiconductor switch and the second semiconductor switch.

Another aspect of the disclosure may include a data communication link arranged between the gate drive and the gate controller; wherein the gate drive is arranged to communicate a plurality of parameters to the gate controller via a modulated square wave; wherein the modulated square wave includes a frequency and a duty cycle; and wherein the frequency is indicative of a monitored parameter of the hybrid switch power module, and wherein the duty cycle is indicative of a magnitude of the monitored parameter of the hybrid switch power module.

Another aspect of the disclosure may include a power multiplexer and a power supply being arranged in the gate driver; wherein the power multiplexer includes a plurality of complementary switch pairs arranged between the power supply, the positive rail and the negative rail of the first low voltage power bus, and the positive rail and the negative rail of the second low voltage power bus; and wherein the gate driver controls the plurality of complementary switch pairs to control the positive and negative DC voltage levels of the first low-voltage power bus, and to control the positive and negative DC voltage levels of the second low-voltage power bus.

Another aspect of the disclosure may include a gate drive system for a multi-phase power inverter that includes a gate controller, a gate drive circuit, and a hybrid switch power module; wherein the hybrid switch power module is arranged between one of a positive high-voltage (HV) DC power rail or a negative HV DC power rail and an AC power link coupled to the multi-phase power inverter; wherein the hybrid switch power module includes a first semiconductor switch connected in parallel with a second semiconductor switch; wherein the first semiconductor switch has a first performance characteristic; wherein the second semiconductor switch has a second performance characteristic; wherein the first performance characteristic differs from the second performance characteristic; wherein the gate drive circuit includes a gate driver, a first variable resistance circuit, and a second variable resistance circuit; wherein the first variable resistance circuit is powered via a first low-voltage DC power bus; wherein the second variable resistance circuit is powered via a second low-voltage DC power bus; wherein the first variable resistance circuit connects to a first gate of the first semiconductor switch; wherein the second variable resistance circuit connects to a second gate of the second semiconductor switch; wherein the gate driver controls a first positive voltage level and a first negative voltage level of the first low-voltage DC power bus to control at least one of a first positive voltage level and a first negative voltage level at the first gate of the first semiconductor switch; wherein the first positive voltage level and the first negative voltage level at the first gate of the first semiconductor switch are determined based upon the first performance characteristic; wherein the gate driver controls a second positive voltage level and a second negative voltage level of the second low-voltage DC power bus to control at least one of a second positive voltage level and a second negative voltage level at the second gate of the second semiconductor switch; and wherein the second positive voltage level and the second negative voltage level at the second gate of the second semiconductor switch are determined based upon the second performance characteristic.

Another aspect of the disclosure may include a vehicle system that includes a gate drive system, a multi-phase power inverter, and an electric machine. The multi-phase power inverter is operatively connected to the electric machine via a plurality of phase legs, and the gate drive system including a gate controller, a gate drive circuit, and a plurality of hybrid switch power modules, wherein the plurality of hybrid switch power modules are electrically coupled to the plurality of phase legs of the multi-phase power inverter. Each of the plurality of hybrid switch power modules includes a first semiconductor switch connected in parallel with a second semiconductor switch between one of a positive high-voltage (HV) DC power rail or a negative HV DC power rail and one of the plurality of phase legs of the multi-phase power inverter, the first semiconductor switch having a first set of performance characteristics and the second semiconductor switch having a second set of performance characteristics differing at least partially from the first set of performance characteristics. The gate drive circuit includes a gate driver, a first variable resistance circuit, and a second variable resistance circuit; the first variable resistance circuit being powered via a first low-voltage DC power bus; the second variable resistance circuit being powered via a second low-voltage DC power bus; the first variable resistance circuit connects to a first gate of the first semiconductor switch; the second variable resistance circuit connects to a second gate of the second semiconductor switch; the gate driver controls a first positive voltage level and a first negative voltage level of the first low-voltage DC power bus to control at least one of a first positive voltage level and a first negative voltage level at the first gate of the first semiconductor switch; the gate driver controls a second positive voltage level and a second negative voltage level of the second low-voltage DC power bus to control at least one of a second positive voltage level and a second negative voltage level at the second gate of the second semiconductor switch; and the first positive voltage level at the first gate of the first semiconductor switch differs from the second positive voltage level at the second gate of the second semiconductor switch.

The above summary is not intended to represent every possible embodiment or every aspect of the present disclosure. Rather, the foregoing summary is intended to illustrate some of the aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which:

FIGS. 9-1 and 9-2 graphically illustrate operation of an overvoltage protection circuit, in accordance with the disclosure.

Figure 1:
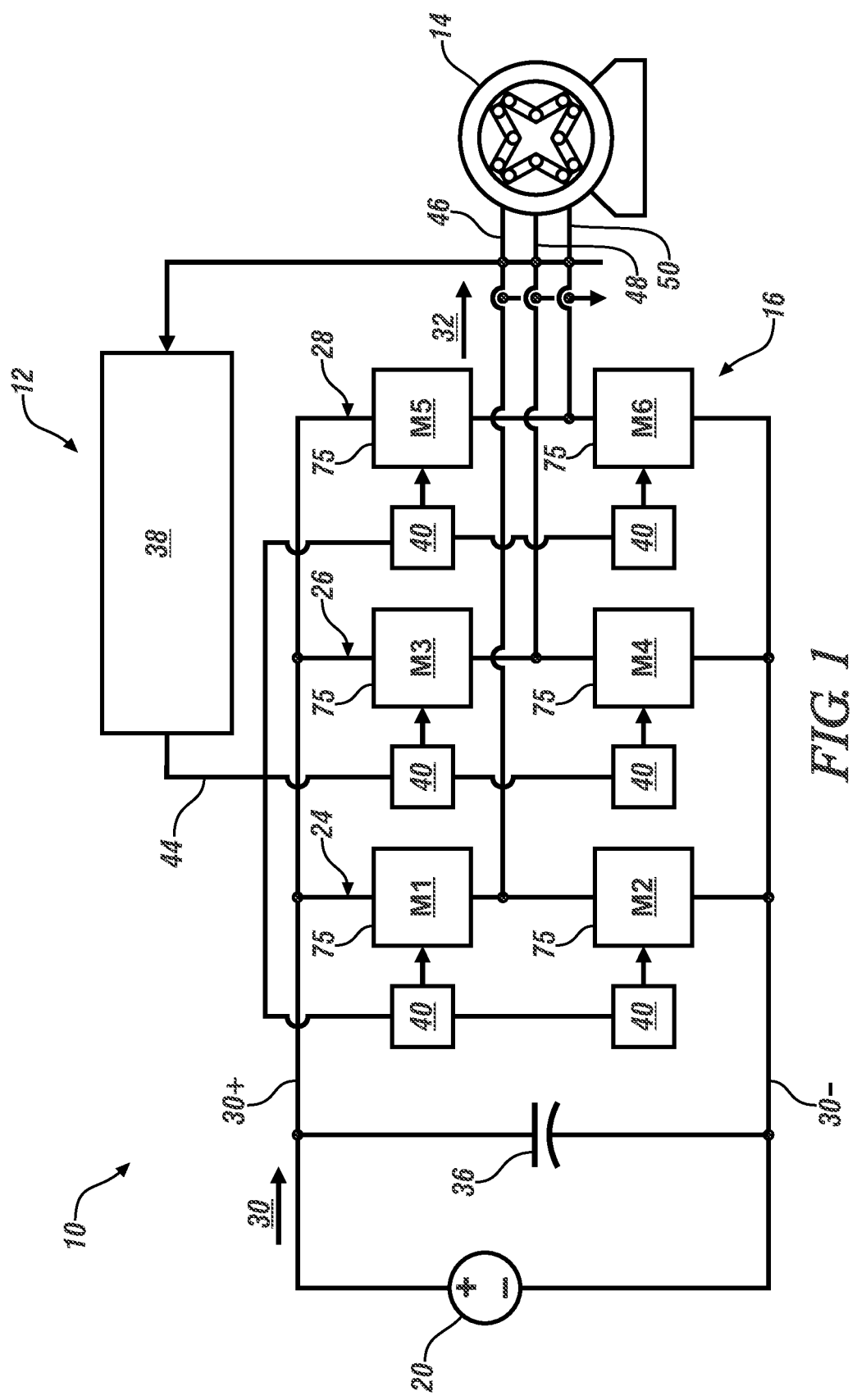
FIGS. 1 and 2 schematically illustrate details related to an embodiment of an Electric Power System (EPS) for transferring electric power between a rechargeable electric energy storage system (RESS) and a multi-phase rotary electric motor/generator (electric machine), in accordance with the disclosure.

The appended drawings are in simplified form and are not to precise scale, and may present a somewhat simplified representation of various features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

For purposes of convenience and clarity, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

The use of ordinals such as first, second and third does not necessarily imply a ranked sense of order, but may distinguish between multiple instances of an act or structure.

The following detailed description is merely illustrative in nature and is not intended to limit the application and uses. Furthermore, there is no intention to be bound by an expressed or implied theory presented herein. Throughout the drawings, corresponding reference numerals indicate like or corresponding elements and features.

Detailed embodiments of the present disclosure may be disclosed herein; however, it may be understood that the disclosed embodiments may be merely illustrative of the disclosure that may be embodied in various and alternative forms. Elements of some features may be exaggerated or minimized to show details of particular components. Therefore, specific structural and functional details disclosed herein may need not to be interpreted as limiting, but merely as a representative basis for teaching one skilled in the art to variously employ the present disclosure.

The present disclosure is susceptible of being embodied in various forms. Representative examples of the disclosure are shown in the drawings and described herein in detail as non-limiting examples thereof. To that end, elements and limitations described herein, but not explicitly set forth in the claims, are not to be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing," "comprising," "having," and the like shall mean "including without limitation." Moreover, words of approximation such as "about," "almost," "substantially," "generally," "approximately," etc., may be used herein in the sense of "at, near, or nearly at," or "within 0-5% of," or "within acceptable manufacturing tolerances," or logical combinations thereof.

As used herein, the term "system" refers to mechanical and electrical hardware, software, firmware, electronic control componentry, processing logic, and/or processor device, individually or in combination, including without limitation: application specific integrated circuit (ASIC), an electronic circuit, a processor (shared, dedicated, or group) that executes one or more software or firmware programs, memory device(s) that electrically store software or firmware instructions, a combinatorial logic circuit, and/or other components that provide the described functionality.

As employed herein, terms such as "vertical", "horizontal", "left", "right", "upper", "lower", "top", "bottom" and similar expressions are non-limiting terms that merely describe the various elements as illustrated in the Figures, and are not intended to limit the scope of the disclosure.

As used herein, the term "electric machine" refers to a rotary electric motor/generator device including a rotor and a stator that is capable of converting electric power to mechanical power and/or converting mechanical power to electric power by electromagnetic effort.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, a serial peripheral interface (SPI) link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The term "signal" refers to a physically discernible indicator that conveys information, and may be a suitable waveform (e.g., electrical, optical, magnetic, mechanical, or electromagnetic), such as DC (direct current), AC (alternating current), sinusoidal-wave, triangular-wave, square-wave, vibration, and the like, that is capable of traveling through a medium.

The terms "calibration", "calibrated", and related terms refer to a result or a process that correlates a desired parameter and one or multiple perceived or observed parameters for a device or a system. A calibration as described herein may be reduced to a storable parametric table, a plurality of executable equations or another suitable form that may be employed as part of a measurement or control routine.

A parameter is defined as a measurable quantity that represents a physical property of a device or other element that is discernible using one or more sensors and/or a physical model. A parameter can have a discrete value, e.g., either "1" or "0", or can be infinitely variable in value.

Figure 2:
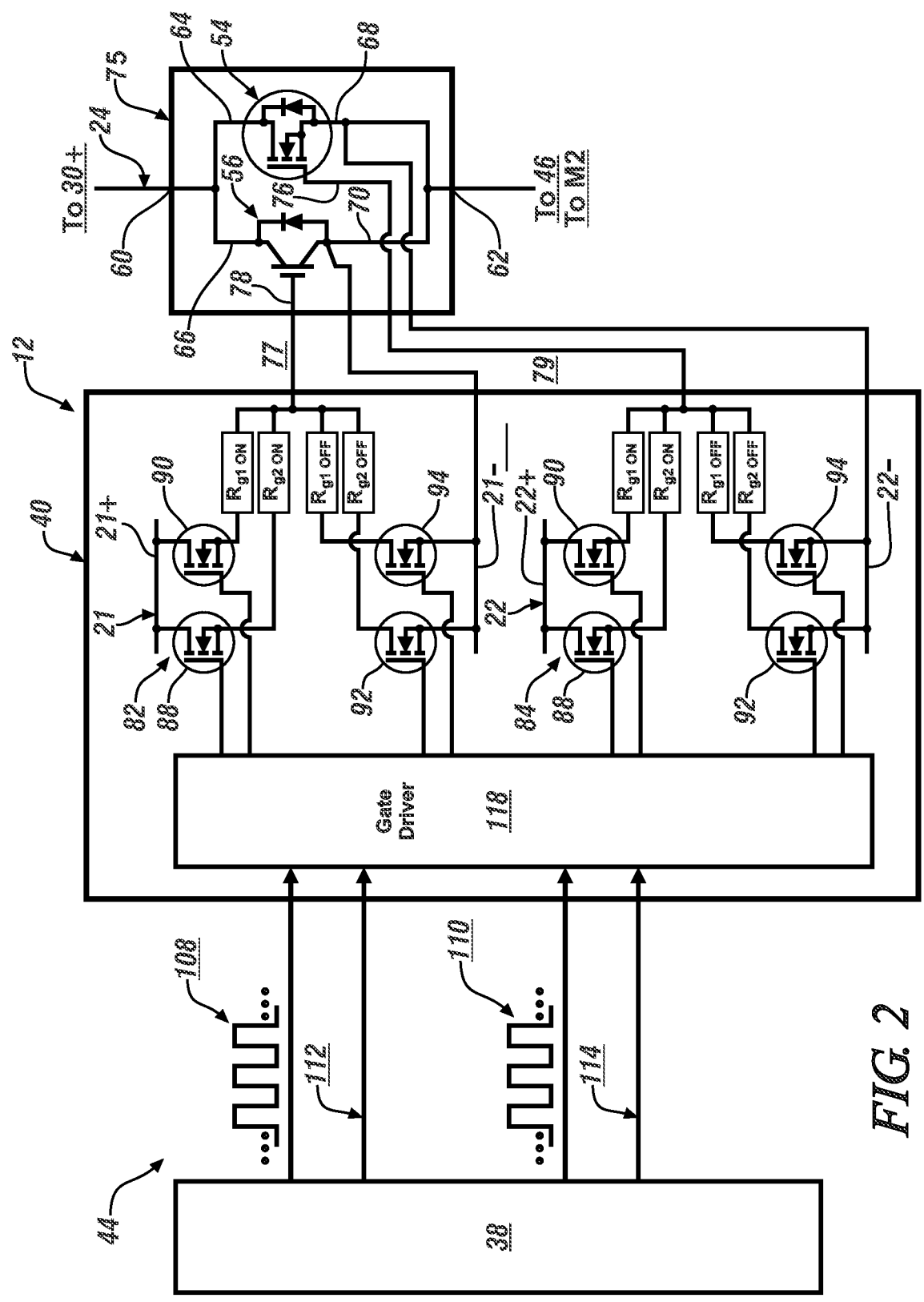

Referring to the drawings, wherein like reference numbers refer to the same or like components in the several Figures, FIGS. 1 and 2 schematically illustrate details related to an embodiment of an Electric Power System (EPS) 10 that includes a rechargeable electric energy storage system (RESS) 20, a gate drive system 12, a multi-phase power inverter (PIM) 16, and a multi-phase rotary electric motor/generator (electric machine) 14. The EPS 10 is capable of converting DC electric power to AC electric power to generate torque via the electric machine 14, and is capable of regeneratively reacting torque input from the electric machine 14 to generate DC electric power that is storable on the RESS 20. In one embodiment, the EPS 10 is an electrified vehicle system.

The RESS 20 connects to the PIM 16 via a high-voltage power bus 30 that includes a positive high-voltage DC power rail (HV+) 30+ and a negative high-voltage DC power rail (HV−) 30−.

The PIM 16 is a multi-phase power inverter, which may include, by way of non-limiting examples, a two-phase inverter, a three-phase inverter, a four-phase inverter, etc. As shown and described herein, the PIM 16 is a three-phase power inverter. The PIM 16 includes a plurality of phase legs that have a plurality of hybrid switch power modules 75, indicated as M1, M2, M3, M4, M5 and M6. The PIM 16 is arranged with a first phase leg 24, a second phase leg 26, and a third phase leg 28. The first phase leg 24 is composed of a pair of the hybrid switch power modules M1, M2 that are arranged in series between HV+ 30+ and HV− 30−, and are connected at a first node that connects via a first AC power link 46 to a first phase of the electric machine 14. The second phase leg 26 is composed of hybrid switch power modules M3, M4 that are arranged in series between HV+ 30+ and HV− 30−, and are connected at a second node that connects via a second AC power link 48 to a second phase of the electric machine 14. The third phase leg 28 is composed of hybrid switch power modules M5, M6 that are arranged in series between HV+ 30+ and HV− 30−, and are connected at a third node that connects via a third AC power link 50 to a third phase of the electric machine 14.

The EPS 10 includes the gate drive system 12 for controlling operation of the PIM 16, and thus controlling operation of the electric machine 14. When an embodiment of the EPS 10 is deployed as an electrified vehicle system, it may be deployed to provide mechanical, tractive torque that is useable to propel the vehicle or otherwise perform work on-vehicle.

The gate drive system 12 includes a gate controller 38, and a plurality of gate drive circuits 40, wherein the gate drive circuits 40 are arranged to individually control the plurality of hybrid switch power modules 75 between opened and closed states to facilitate converting a direct current (DC) output 30 of the RESS 20 to a plurality of alternating current (AC) inputs that are transferred to the electric machine 14 via the first, second, and third AC power links 46, 48, 50, respectively.

The gate controller 38 generates a plurality of control signals 44 to individually control the plurality of gate drive circuits 40, and thus individually control activation and deactivation of the plurality of hybrid switch power modules 75 in response to a request for output torque from the electric machine 14. Additional details related to the gate controller 38, the plurality of gate drive circuits 40, and the control signals associated therewith, e.g., pulsewidth modulated (PWM) control signals and slew rate control signals, are described with reference to FIG. 2, et seq.

Referring again to FIG. 1, the RESS 20 may be a battery or other energy storage device capable of supplying electrical power to and receiving electrical power from the electric machine 14 via the PIM 16. A DC link capacitor 36 may be included to smooth, filter, and otherwise process the DC output 30 for use with the PIM 16. The gate controller 38 of the gate drive system 12 may individually and specifically control the plurality of gate drive circuits 40 to control a rate, speed, timing, etc. of switching events for the hybrid switch power modules 75, including those used to control transitioning of the hybrid switch power modules 75 between ON and OFF or opened and closed states. The transitioning of the hybrid switch power modules 75 between states may be performed according to corresponding plurality of control signals 44 provided from the gate controller 38. The gate controller 38 may be configured for individually providing the plurality of control signals 44 to each of the gate drive circuits 40. The gate controller 38 may include a non-transitory computer-readable storage medium having a plurality of non-transitory instructions stored thereon, which when executed with an associated one or more processors, may be operable in accordance with the present disclosure to facilitate generating the plurality of control signals 44 in a manner that provides a desirable slew rate while also managing the AC input 32 as needed for proper powering of the electric machine 14. The gate controller 38 may be used in this manner to facilitate switching events for the hybrid switch power modules 75 whereby the DC output 30 may be converted to the AC input 32. The AC input 32 may be generated in the illustrated manner to provide a polyphase output having a plurality of AC power links 46, 48, 50 that couple to the electric machine 14, which are shown for non-limiting purposes to correspond with a three-phase implementation where a three-phase AC input 32 is provided to an AC bus or windings of the electric machine 14, such as via a corresponding input terminal for the associated AC input 32.

FIG. 2 illustrates a partial schematic view of an embodiment of the gate drive system 12 and PIM 16 of the EPS 10, including one of the gate drive circuits 40 and a first of the first hybrid switch power modules M1 75. The circuit topology and configuration are representative of how each of the plurality of gate drive circuits 40 may be arranged and controlled to interact with each of the other hybrid switch power modules 75, i.e., hybrid switch power modules M2, . . . . M6. The gate drive system 12 includes gate controller 38, gate drive circuit 40, and hybrid switch power module 75, which connects between one of the positive power rail 30+ (as illustrated) or the negative power rail 30–, and to one of the AC power links 46, 48, 50 of the electric machine 14, as shown with reference to FIG. 1.

Referring again to FIG. 2, the gate controller 38 generates the plurality of control signals 44 that are communicated to the plurality of gate drive circuits 40 to individually control activation and deactivation of the plurality of hybrid switch power modules 75 in response to a request for output torque from the electric machine 14. The plurality of control signals 44 may be communicated to the plurality of gate drive circuits 40 via one or more of direct wired point-to-point links including direct wired point-to-point discrete links, direct wired point-to-point digital links, etc., or serial peripheral interface (SPI) links, wireless links, etc. The plurality of control signals 44 provided to each of the plurality of gate drive circuits 40 include a first PWM control signal 108 and a first slew rate signal 112 for controlling the first semiconductor switch 56 between ON and OFF states, and a second PWM control signal 110 and a second slew rate signal 114 for controlling the second semiconductor switch 54 between ON and OFF states.

Each of the gate drive circuits 40 includes a gate driver 18 that connects to and controls first and second variable resistance circuits 82, 84, respectively, to control the respective hybrid switch power module 75.

Each of the hybrid switch power modules 75 includes two or more semiconductor switches 56, 54, wherein the switches 56, 54 have differing performance characteristics. The illustrated example includes the hybrid switch power module 75 having a first semiconductor switch (Q1) 56 connected in parallel with a second semiconductor switch (Q2) 54. It is appreciated that there may be three or more semiconductor switches connected in parallel within the scope of the disclosure. The first and second semiconductor switches 56, 54 are shown to be connected in parallel for illustrative purposes as the present disclosure fully contemplates the switches 56, 54 being connected in series and/or additional switches being employed, with the additional switches being connected in series and/or in parallel with each other. The first and second semiconductor switches 56, 54 may be of a different technology such that the first semiconductor switches 56 may have a first set of performance characteristics and the second semiconductor switches 54 may have a second set of performance characteristics differing at least in part from the first set of performance characteristics. One aspect of the present disclosure contemplates varying slew rates of the semiconductor switches 56, 54 to optimize the DC-to-AC conversion, optionally by leveraging use of the differing performance characteristics of the semiconductor switches 56, 54 according to those most suitable for the present operating conditions of the electric machine.

The first and second semiconductor switches 56, 54 may be composed of various semiconductors or other types of switches 56, 54 having differing technologies. This may include, for example, the first semiconductor switches 56 being Metal-Oxide-Semiconductor Field-Effect Transistors (MOSFETs) or Silicon Carbide (SiC) MOSFETs, the second semiconductor switches 54 being Insulated Gate Bipolar Transistors (IGBTs) or Si IGBTs, and/or according to other differences, e.g., the first semiconductor switches 56 may be silicon type devices, and the second semiconductor switches 54 may be wide bandgap (WBG) type devices. In this configuration, the first set of performance characteristics may correspond with a first switching speed rating, a first voltage rating, a first current rating, and/or a first efficiency rating, and the second set of performance characteristics may correspond with a second switching speed rating, a second voltage rating, a second current rating, and/or a second efficiency rating. The first switching speed rating may be faster than the second switching speed rating, the first voltage rating may be less than the second voltage rating, the first current rating may be less than the second current rating, and/or the first efficiency rating may be greater than the second efficiency rating. The gate controller 38 may utilize these performance differences to control transitioning of the first and second semiconductor switches 56, 54 between ON and OFF states according to variable slew rates.

The hybrid switch power modules 75 may be individually fabricated as discrete or separate integrated circuits (IC), which may be packaged in a corresponding housing. The hybrid switch power modules 75 may each employ separate ICs for the first and second semiconductor switches 56, 54 and/or additional switches included thereon. The hybrid switch power modules 75 may include pins, traces, or other physical constructs to facilitate the electrical interconnections contemplated herein. While other arrangements are contemplated, the hybrid switch power modules 75 are shown to include an input 60 and an output 62 to the associated phase leg 24, a source 64 of the first semiconductor switch 56 connected to a collector 66 of the second semiconductor switch 54, a drain 68 of the first semiconductor switch 56 connected to an emitter 70 of the second semiconductor switch 54, and a plurality of interfaces operable with the gate drive circuits 40 to facilitate biasing a gate 78 of the first semiconductor switch 56 and biasing a second gate 76 of the second semiconductor switch 54.

Each gate drive circuit 40 includes first and second variable resistance circuits 82, 84, respectively, for controlling a respective hybrid switch power module 75. The variable resistance circuits 82, 84 may each include a plurality of buffer switches 88, 90, 92, 94 and a plurality of resistors including two ON resistors $R_{Gg1\_ON}$, $R_{g2\_ON}$ and two OFF resistors $R_{g1\_OFF}$, $R_{g2\_OFF}$. The buffer switches 88, 90, 92, 94 may be operable between ON and OFF states to respectively connect and disconnect an associated one or more of the resistors to first and second low-voltage DC power buses 21, 22, respectively. The illustrated configuration includes each of the first and second variable resistance circuits 82, 84 including two ON buffer switches 88, 90 and two OFF buffer switches 92, 94, respectively, for connecting and disconnecting two ON resistors $R_{g1\_ON}$, $R_{g2\_ON}$ and two OFF resistors $R_{g1\_OFF}$, $R_{g2\_OFF}$ to the positive and/or negative power rails 21, 22 and first and second gates 78, 76, respectively, of the corresponding first and second semiconductor switches 56, 54. The aforementioned elements of first variable resistance circuit 82 are powered via the first low voltage DC power bus 21 including a positive rail 21+ and a negative rail 21−, and the aforementioned elements of the second variable resistance circuit 84 are powered via second low voltage DC power bus 22 including a positive rail 22+ and a negative rail 22−. The gate driver 118 controls positive and negative DC voltage levels of the positive rail 21+ and negative rail 21−, respectively, of the first low voltage power bus 21, and controls positive and negative DC voltage levels of the positive rail 22+ and negative rail 22−, respectively, of the second low voltage power bus 22.

In one embodiment, the positive DC voltage level of the positive rail 21+ of the first low voltage power bus 21 differs from the positive DC voltage level of the positive rail 22+ of the second low voltage power bus 22.

In one embodiment, the positive DC voltage level of the positive rail 21+ of the first low voltage power bus is the same as the positive DC voltage level of the positive rail 22+ of the second low voltage power bus.

In one embodiment, the negative DC voltage level of the negative rail 21− of the first low voltage power bus differs from the negative DC voltage level of the negative rail 22− of the second low voltage power bus.

In one embodiment, the negative DC voltage level of the negative rail 21− of the first low voltage power bus is the same as the negative DC voltage level of the negative rail 22− of the second low voltage power bus.

The gate controller 38 may be configured to generate the plurality of control signals 44 to provide each gate drive circuit 40 with corresponding first and second PWM control signals 108, 110 for respectively controlling the first and second semiconductor switches 56, 54 between ON and OFF states, i.e., PWM control, and first and second slew rate signals 112, 114 for respectively controlling first and second slew rates of the first and second semiconductor switches 56, 54. Specifically, and in one embodiment, the first variable resistance circuit 82 generates a first gate voltage 77 that is input to first gate 78 for controlling the first semiconductor switch 56 based upon the first PWM control signal 108 and the first slew rate signal 112, and the second variable resistance circuit 84 generates a second gate voltage 79 that is input to second gate 76 for controlling the second semiconductor switch 54 based upon the second PWM control signal 110 and the second slew rate signal 114.

As described herein, the control of any one of, some of, or all of the first and second PWM control signals 108, 110 and the first and second slew rate signals 112, 114 is to synchronize the first switching transient in the first of the first and second semiconductor switches 56, 54 with the second switching transient in the second of the first and second semiconductor switches 56, 54 of the hybrid switch power module 75 such that the current load being carried by the first of the switches is equal to the current load being carried by the second switch during ON/OFF transients and during ON/OFF transients. Stated another way, the control of any one of, some of, or all of the first and second PWM control signals 108, 110 and the first and second slew rate signals 112, 114 is to balance a first current load across the first semiconductor switch with a second current load across the second semiconductor switch during an activation-to-deactivation transition and during a deactivation-to-activation transition in each of the hybrid switch power module 75.

The gate drive circuit 40 includes the gate driver 118, which is operable for processing the first and second PWM control signals 108,110 and the first and second slew rate signals 112, 114 to implement the desired control via the variable resistance circuits 82, 84. The gate driver 118 may process the first and second slew rate signals 112, 114 to determine the desired combinations of the ON and OFF resistors and process the control signals 108, 110 to determine desired timing of the buffer switches 88, 90, 92, 94 between ON and OFF states. While the present disclosure fully contemplates additional ON and OFF resistors and/or ON and OFF buffer switches 88, 90, 92, 94 being employed to facilitate additional resistor combinations, the illustrated configuration provides three different resistance combinations for each of the ON and OFF resistors, i.e., ON resistors $R_{g1\_ON}$, $R_{g2\_ON}$ and OFF resistors $R_{g1\_OFF}$, $R_{g2\_OFF}$. A duty cycle of the control signals 108, 110, which are shown to be pulse width modulated (PWM) signals. The PWM signal includes a frequency component and a duty cycle component, wherein the duty cycle component may be varied to finely adjust the gate voltage and/or current at precise levels depending on the desired slew rate, e.g., to facilitate adjusting the slew rate in real-time according to desired operation of the electric machine 14. While not shown in individual detail, a plurality of sensors or other features may be employed to facilitate measuring or otherwise determining a DC voltage of the DC source 20, a temperature of the DC link capacitor 36, a current of one or more of the AC inputs 32, and a junction temperature, a maximum discharge time, a drain-source voltage (Vds), a voltage threshold (Vth) of the hybrid switch power modules, i.e., hybrid switch power modules M1, M2, . . . M6.

The gate controller 38 may process the sensor measurements, metrics, etc. to determine a desirable slew rate for each of the hybrid switch power modules 75, which may include selecting the plurality of control signals 44 to optimize transitions between the opened and closed states as a function of operating conditions of the electric machine 14 and the first and second sets of performance characteristics.

The gate controller 38 may employ temperature (simulated, calculated, or measured) as an operating parameter for each semiconductor switch technology. By way of a non-limiting example, the semiconductor switches 56, 54 may have different performance characteristics, which may be employed as inputs that allow for temperature warning, shutdown limits, or protection for slew rate usages. The gate controller 38 may include a slew rate selection process based on individual or combinations of operating conditions such as, but not limited to: inverter terminal voltage, RESS open circuit voltage, RESS terminal, semiconductor switch temperature (measured or estimated), inverter output current, motor torque, motor speed, PWM frequency, PWM modulation type, dV/dt of dI/dt of the semiconductor switches, threshold voltage of the semiconductor switches, and/or voltage at the semiconductor switches 56, 54. Slew rate may be controlled by both the present/future operating conditions of the electric machine 14, and/or the present or future operating conditions of the electric propulsion system and/or other systems cooperating with the electric machine 14, e.g., the inverter may be controlled to set the torque and speed of the electric machine 14. The gate controller 38 may use one set of resistances for increasing efficiency in Enhanced Current Output Performance (ECOP) regions, use another set of resistances for peak current, and use the last set of resistances to increase losses in the PIM 16 for use of the hybrid switches 56, 54 individually or in parallel. This may be used to optimize losses in different operation areas by using specific semiconductor switches and slew rates in specific regions. Furthermore, optimization can be done based on using a combination of different semiconductor switches having different slew rates. The gate controller 38 may use the variable slew rates to decrease losses, increase peak performance, and decrease chip/die temperatures during operation of the power electronic system for parallel or individual semiconductor switch operation and/or to protect the semiconductor switches 56, 54 from overvoltage.

Figure 3:
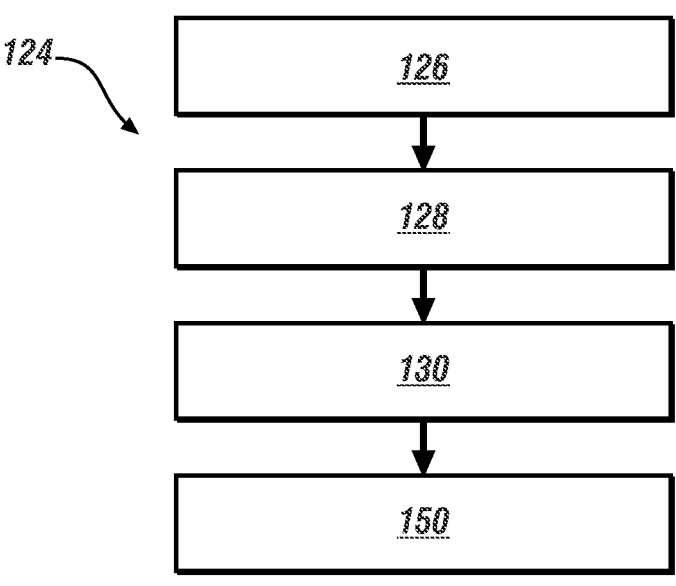
FIG. 3 illustrates a flowchart of a method for variable slew rate powering of an electric machine in accordance with one aspect of the present disclosure.

FIG. 3 illustrates a flowchart 124 of a method for variable slew rate powering of an electric machine in accordance with one aspect of the present disclosure. The flowchart 124 may be reduced to practice as one or more algorithms and calibrations. The method is predominantly described with respect to powering an embodiment of the electric machine 14 that is configured for converting an AC input to a mechanical output suitable for propelling a vehicle. However, the present disclosure fully contemplates the method being useful for powering other types of electric machines. Block 126 relates to a performance characteristics process whereby the gate controller 38 or other functioning element determines performance characteristics for a plurality of semiconductor switches 56, 54 included within each of a plurality of hybrid switch power modules 75 configured for converting a DC output 30 to an AC input 32 suitable for powering the electric machine 14. The performance characteristics may relate to a wide variety of parameters, constraints, abilities, and other aspects of the semiconductor switches 56, 54, including those that may differentiate capabilities of the semiconductors switches 56, 54 relative to each other. Depending on the technology of the semiconductor switches 56, 54, one of the semiconductor switches 56, 54 included onboard one of the hybrid switch power modules 75 may be more efficient, less expensive, more reliable, have higher operating boundaries than another one of the semiconductor switches 56, 54 included onboard the same hybrid switch power modules 75. These performance characteristics may be analyzed to determine situations when one of semiconductor switches 56, 54 may be more favored than other semiconductor switches 56, 54 and/or when conditions may warrant use of both semiconductor switches 56, 54 simultaneously.

Block 128 relates to an operating conditions process whereby the gate controller 38 or other functioning element may determine operating conditions of the electric machine 14. The operating conditions may relate to a wide variety of parameters, constraints, abilities, values, and other aspects of the electric machine 14, including those associated with present or ongoing operating conditions and/or those expected to occur in the near future. The operating conditions, for example, may relate to bearing current, motor peak voltage, motor torque, motor speed, temperature, etc. Block 130 relates to a slew rate preference process whereby the gate controller 38 or other functioning element may determine preferences for varying the ON/OFF slew rate of the semiconductor switches 56, 54, and thereby transitioning of the hybrid switch power modules 75 between opened and closed states. The slew rate preference process may include analysis of the performance characteristics associated with the semiconductor switches 56, 54 and the operating conditions of the electric machine 14 to determine whether it is desirable or optimal to prefer a faster slew rate, a slower slew rate, or a custom slew rate. A faster slew rate may result in less losses but at the consequence of less electromagnetic compatibility (EMC), i.e., more electromagnetic interference (EMI), while a slower slew rate may have the opposite result, i.e., more losses but at greater or improved EMC.

Figure 4:
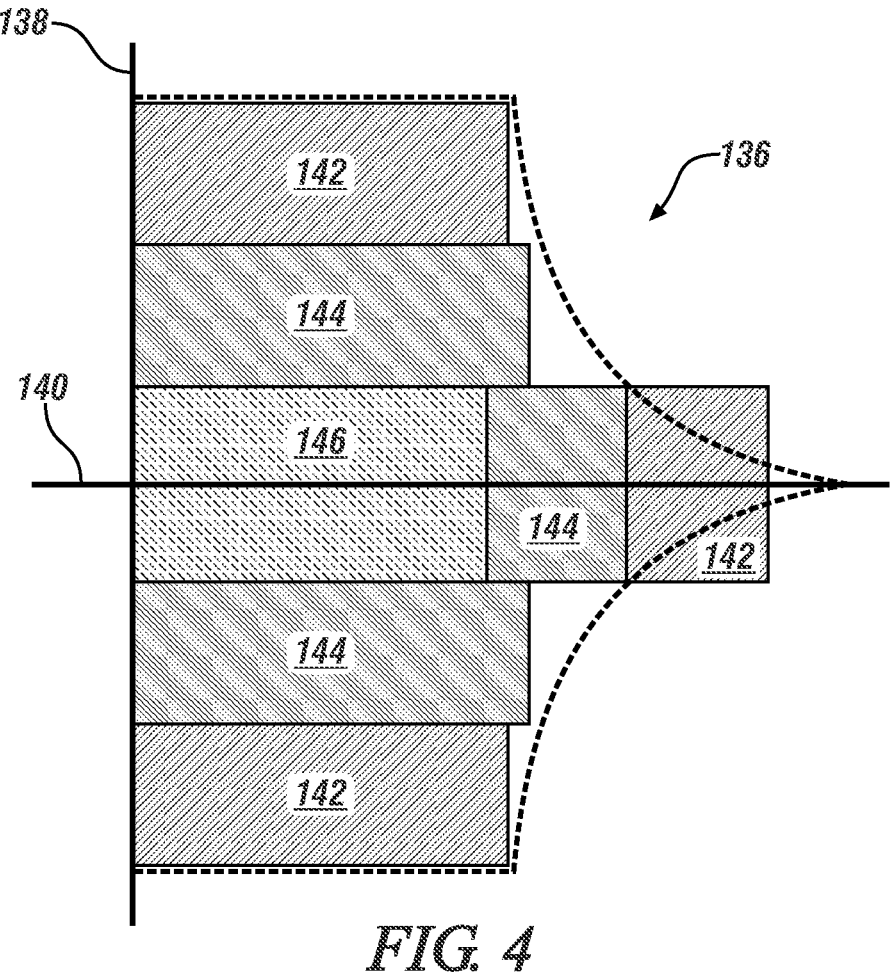
FIG. 4 illustrates a slew rate graph in accordance with one aspect of the present disclosure.

FIG. 4 illustrates a slew rate graph 136 in accordance with one aspect of the present disclosure. The graph includes a vertical axis 138 and a horizontal axis 140 to represent values useful in selecting or differentiating between desired slew rates at certain times.

The values included in the axes 138, 140 may be delineated according to the various performance characteristics of the semiconductor switches 56, 54 and/or the operating conditions of the electric machine 14.

For non-limiting purposes, the vertical axis 138 is described as corresponding with motor torque and the horizontal axis 140 is described as corresponding with motor speed. The graph 136 indicates a plurality of slew rate regions 142, 144, 146 defined relative to boundaries set according to motor torque and speed, however, similar demarcations may be defined and/or the motor torque and speed may be related or extrapolated, according to voltage, current, temperature, etc.

The slew rate regions 142, 144, 146 may correspond with slew rates desired for differing combinations of motor torque and speed, which in the illustrated configuration includes a first region 142, a second region 144, and a third region 146.

The first region 142 may be associated with a slew rate slower than the second region 144 and the second region 144 may be associated with a slew rate slower than the third region 146. The use of three slew rates is presented for non-limiting purposes based on the above-described variable resistance circuits 82, 84 including three different combinations of resistors, i.e., each combination of resistors being associated with a difference in rate.

As one skilled in the art may appreciate, additional granularity in the slew rates may be achieved by including additional resistor combinations in the variable resistance circuits 82, 84 or other capabilities for adjusting biasing of the semiconductor switches 56, 54.

Returning to FIG. 3, Block 150 relates to generating control and slew rate signals for respectively turning ON/OFF the semiconductor switches 56, 54 and the slew rate associated therewith. Depending on the slew rate region 142, 144, 146, the corresponding signals may result in one or both of the semiconductor switches 56, 54 being controlled between ON and OFF states. Returning to FIG. 4, the first region 142 may include both semiconductor switches 56, 54 being in the ON state, which may be referred to as a dual mode, with the resistors set to provide the first slew rate, the second region 144 may include both semiconductor switches 56, 54 being in the ON state with the resistors set to provide the second slew rate, and the third region 146 may include the first semiconductor switch being in the ON state while the second semiconductor switch 54 is in the OFF state with the resistors set to provide the third slew rate. The first, second, and third regions 142, 144, 146 are shown to repeat or be used at multiple locations as the use thereof may be desirable for more than one range of operating conditions. Additional slew rate graphs, charts, lookup tables, algorithms, formulas, and the like may be used to similarly define differing slew rate regions, particularly depending on desired preference. This, for example, may include defining differing slew rate regions as a function of efficiency, optimal loss, non-optimal loss, high loss, EMC, EMI, etc.

As supported above, the variable slew rate gate drive system may be beneficial in mitigating impacts of different turn-on/turn-off characteristics of two device types of semiconductor switches to ensure synchronized switching, controlling two or more different device types for use independently or in parallel, keeping those semiconductor switches within rated operation while achieving higher efficiency by having discrete slew rates for corner case operation of each of the devices individually and/or optimized slew rates for operating regions important for minimal losses, providing gate driver flexibility and configurability that avoids limiting the semiconductors types that can be used in a hybrid switch power module, and/or decreased switching losses. The variable slew rates may be created by having at least two sets of gate resistors per transistor technology for both turn-on and turn-off (4 sets total per technology), such as four sets of selectable gate resistances (Rg) for SiC MOSFET semiconductor switches and four sets of selectable gate resistances for Si IGBT semiconductor switches. The two sets of gate resistors, for turn-on and turn-off, can be used individually or in parallel, creating at least three sets of slew rates per transistor technology for turn-on and three sets for turn-off per transistor technology. The variable slew rates may be used to keep the semiconductor switches with the rated operational boundaries at maximum output current and maximum input voltage, while being able to decrease losses in the regions where the semiconductor switch is used the most. In addition to ensuring the semiconductor switches operate within rated voltage and can be as efficient as possible, the multiple slew rate design may be beneficial with current sharing and balancing between the transistor technologies through controlling turn-on and turn-off delays between the technologies independently to accommodate potential intrinsic or necessary delays for operation. Additionally, gate drive specifics may be used in selecting gate voltages needed for the semiconductor switches, ensuring the semiconductor switches may be held off, overcurrent protected, and overvoltage protected, optionally with simplification of PWM control.

Figure 5:
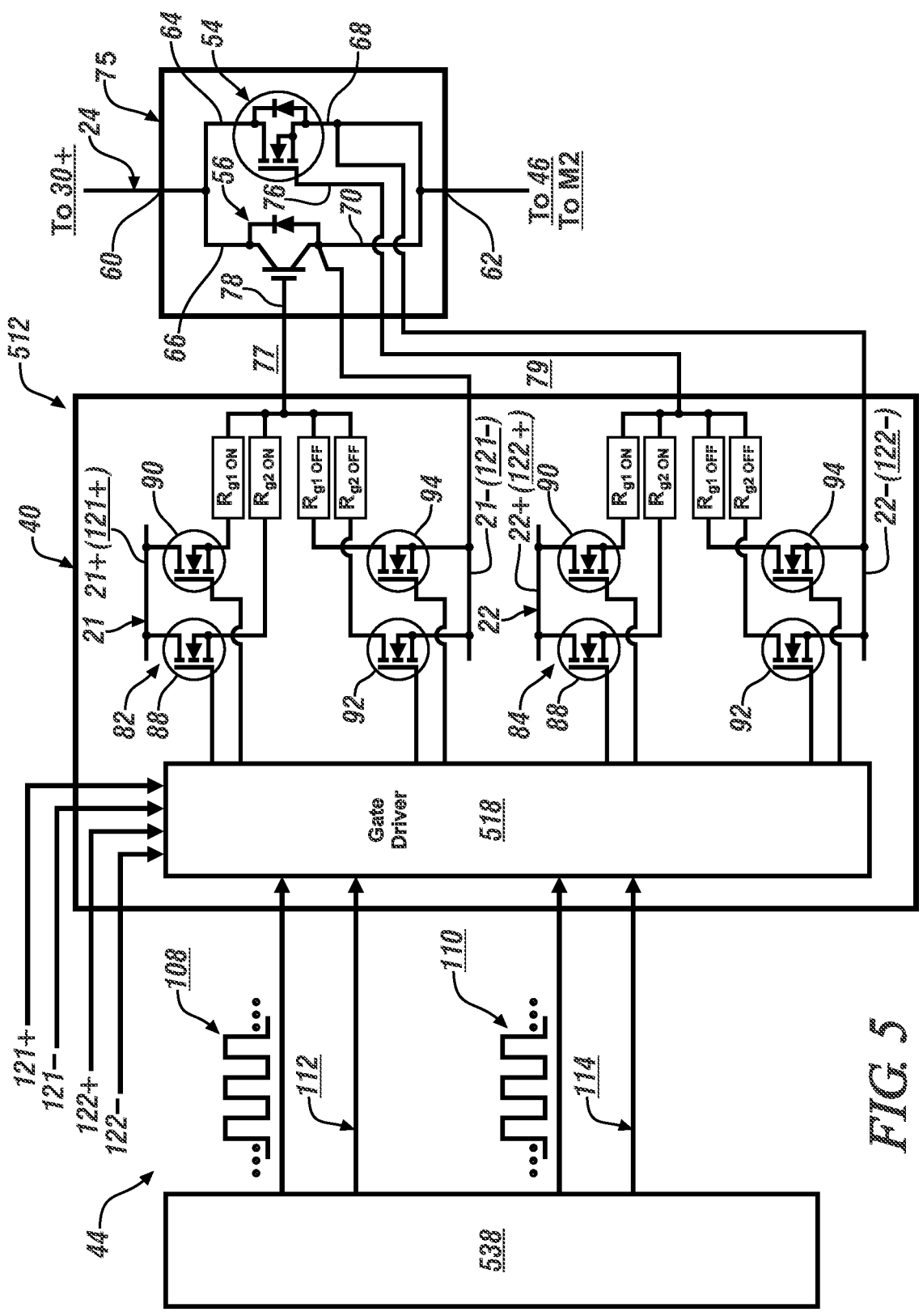
FIG. 5 schematically illustrates a partial schematic view of an embodiment of an EPS including a gate drive system, a portion of a power inverter module including a gate drive circuit, and a hybrid switch power module, in accordance with the disclosure.

FIG. 5 illustrates a partial schematic view of an embodiment of the gate drive system 512, and the EPS 10 described with reference to FIG. 1, including one of the gate drive circuits 540 and a first of the first hybrid switch power modules M1 75. The circuit topology and configuration are representative of how each of the plurality of gate drive circuits 540 may be arranged and controlled to interact with each of the other hybrid switch power modules 75, i.e., hybrid switch power modules M2, . . . . M6. The gate drive system 512 includes gate controller 538, gate drive circuit 540, and hybrid switch power module 75, which connects between one of the positive power rail 30+, as illustrated, or the negative power rail (not shown), and to one of the AC power links 46, 48, 50, as illustrated, of the electric machine 14.

The gate controller 538 generates the plurality of control signals 44 in response to a request for output torque from the electric machine 14. In this embodiment, the plurality of control signals 44 includes the first and second PWM control signals 108,110 and the first and second slew rate signals 112, 114, which are communicated to the gate driver 518, which controls the first and second variable resistance circuits 82, 84.

The first variable resistance circuit 82 generates the first gate voltage 77 that is input to first gate 78 for controlling the first semiconductor switch 56 based upon the first PWM control signal 108 and the first slew rate signal 112.

The second variable resistance circuit 84 generates the second gate voltage 79 that is input to second gate 76 for controlling the second semiconductor switch 54 based upon the second PWM control signal 110 and the second slew rate signal 114.

The aforementioned elements of first variable resistance circuit 82 are powered via a first low voltage DC power bus 21 including a positive rail 21+ and a negative rail 21−, and the aforementioned elements of the second variable resistance circuit 84 are powered via a second low voltage DC power bus 22 including a positive rail 22+ and a negative rail 22−. The gate driver 518 controls first positive and negative DC voltage levels 121+, 121−, respectively, of the positive rail 21+ and negative rail 21−, respectively, of the first low voltage DC power bus 21, and controls second positive and negative DC voltage levels 122+, 122−, respectively, of the positive rail 22+ and negative rail 22−, respectively, of the second low voltage DC power bus 22. In one embodiment, the gate driver 518 includes, operates, and controls an internal DC power supply to generate the first positive and negative DC voltage levels 121+, 121−, respectively, for the first low-voltage DC power bus 21, and the second positive and negative DC voltage levels 122+, 122−, respectively, for the second low-voltage DC power bus 22. Alternatively, another device, e.g., gate controller 538 or an isolated DC power source, generates the first positive and negative DC voltage levels 121+, 121−, respectively, and the second positive and negative DC voltage levels 122+, 122−, respectively.

Because the switch technologies of the first and second semiconductor switches 56, 54 of the hybrid switch power module 75 may differ, e.g., IGBT v. FET configurations, they may benefit from and/or require different gate voltages at the respective first and second gates 78, 76 thereof. By way of a non-limiting example, when the first semiconductor switch 56 is an IGBT, the positive voltage level 121+ on the positive rail 21+ may be set to +18 Vdc, and the negative voltage level 121− on the negative rail 21− may be set to −7 Vdc. By way of a non-limiting example, when the second semiconductor switch 54 is a FET, the positive voltage level 122+ on the positive rail 22+ may be set to +15 Vdc, and the negative voltage level 122− on the negative rail 22− may be set to −4 Vdc.

In one embodiment, the first positive and negative DC voltage levels 121+, 121−, respectively, and the second positive and negative DC voltage levels 122+, 122−, respectively, are regulated external to the gate driver 518, e.g., via gate controller 538 or via another isolated DC power source, and are communicated to the gate driver 518 for implementation.

In one embodiment, the first positive and negative DC voltage levels 121+, 121−, respectively, and the second positive and negative DC voltage levels 122+, 122−, respectively, are internally regulated by the gate driver 518.

In one embodiment, the first positive and negative DC voltage levels 121+, 121−, respectively, are internally regulated by the gate driver 518, and the second positive and negative DC voltage levels 122+, 122−, respectively, are regulated external to the gate driver 518, e.g., via gate controller 538 or via another isolated DC power source.

In one embodiment, the first positive and negative DC voltage levels 121+, 121–, respectively, are regulated external to the gate driver 518, e.g., via gate controller 538 or via another isolated DC power source, and the second positive and negative DC voltage levels 122+, 122–, respectively, are internally regulated by the gate driver 518.

In one embodiment, the first positive DC voltage level 121+ of the positive rail 21+ of the first low voltage power bus 21 differs from the second positive DC voltage level 122+ of the second positive rail 22+ of the second low voltage power bus 22.

In one embodiment, the first positive DC voltage level 121+ of the positive rail 21+ of the first low voltage power bus 21 is the same as the second positive DC voltage level 122+ of the positive rail 22+ of the second low voltage power bus 22.

In one embodiment, the negative DC voltage level 121– of the negative rail 21– of the first low voltage power 21 bus differs from the second negative DC voltage level 122– of the negative rail 22– of the second low voltage power bus 22.

In one embodiment, the negative DC voltage level 121– of the negative rail 21– of the first low voltage power bus 21 is the same as the negative DC voltage level 122– of the negative rail 22– of the second low voltage power bus 22.

Figure 6:
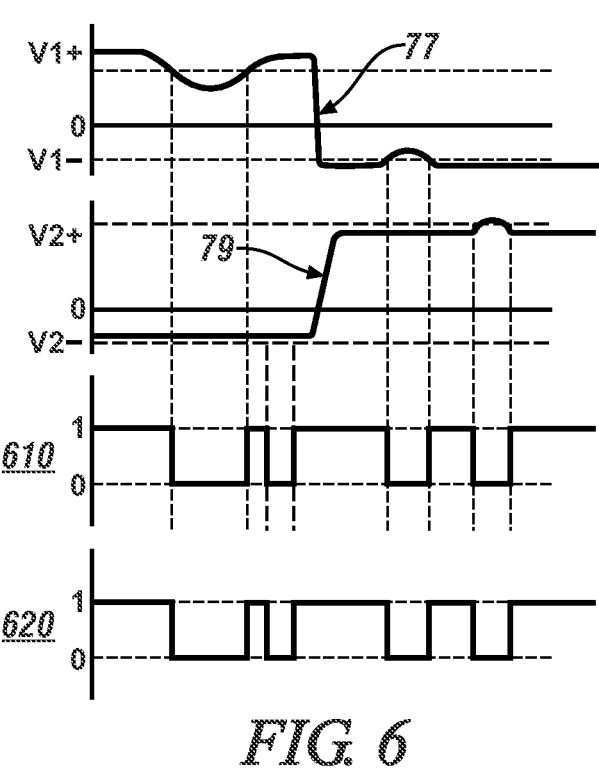
FIG. 6 graphically illustrates gate voltages and associated voltage thresholds for an embodiment of a gate drive system, in accordance with the disclosure.

FIG. 6 graphically illustrates, with continued reference to the gate drive system 512 described with reference to FIG. 5, gate voltages and associated voltage thresholds, including first gate voltage 77 with upper and lower first voltage thresholds V1+, V1–, and second gate voltage 79 with upper and lower second voltage thresholds V2+, V2–, all in relation to time, which is shown on the horizontal axis. These voltage thresholds are configurable and variable based on selection done by the microcontroller through wired or wireless communication utilizing either a communication protocol or an analog pin configuration on the integrated circuit. These thresholds may also be a threshold range, where there is an acceptable range centered around the intended/designed voltages. Fault can be triggered if the actual value of the voltage is above or below that range. The results further show corresponding fault occurrences 610 (no fault=1; fault=0), and output enablements 620 (enabled=1; disabled=0). The upper and lower first voltage thresholds V1+, V1–, and the upper and lower second voltage thresholds V2+, V2– are independently set, and are based upon the specific technology of the respective first and second semiconductor switches 56, 54, e.g., whether IGBT, SiC, etc.

The gate driver 518 has configurable thresholds or threshold ranges for detecting an undervoltage or overvoltage event at the gates (gate bias voltage) of the first and second semiconductor switches 56, 54. The gate driver has the configurability to send a fault signal(s) to the microcontroller in response to occurrence of an overvoltage/undervoltage event, and has a fault default setting to keep the respective gates off until the fault has been reset or cleared. Alternatively, or in addition, a fault may be reported but the gate driver 518 may continue to respond to PWM controls, thus facilitating fault testing within the gate driver and fault monitoring for both sets of gate voltages.

Figure 7:
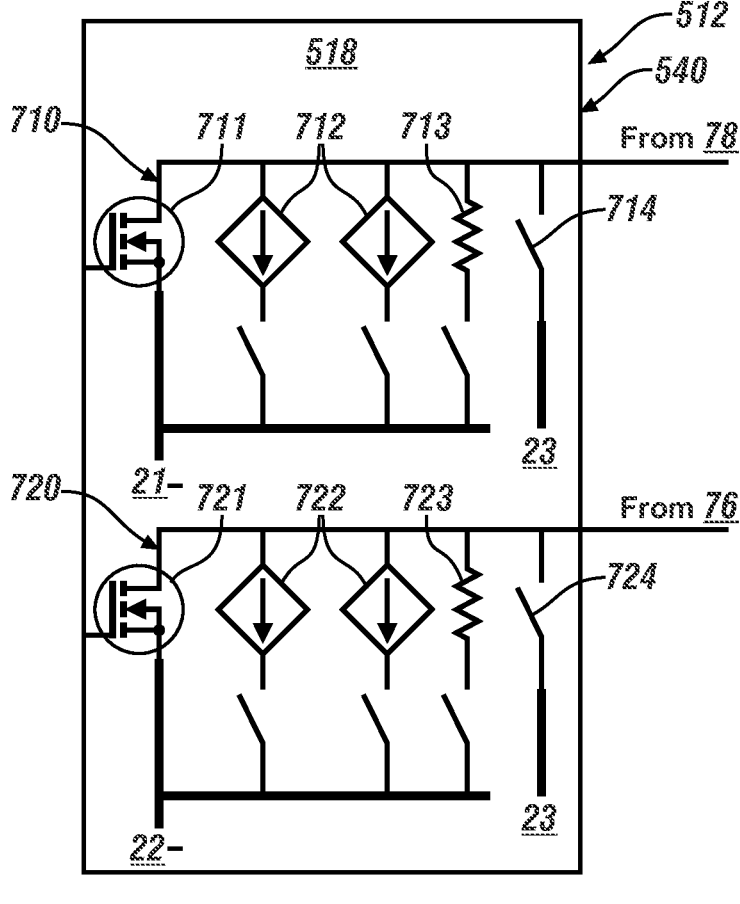
FIG. 7 schematically illustrates a partial schematic view of an embodiment of an EPS including a gate drive system, in accordance with the disclosure.

FIG. 7 schematically illustrates a portion of the gate drive system 512 described with reference to FIG. 5, and the EPS 10 described with reference to FIG. 1, including a portion of one of the gate drive circuits 540 including gate driver 518. As shown, the gate driver 518 includes a first controllable gate clamp 710 and a second controllable gate clamp 720.

The first controllable gate clamp 710 is connected between the first gate 78 of the first semiconductor switch 56 and the negative rail 21– of the first low-voltage DC power bus 21.

Alternatively, or in addition, the first controllable gate clamp 710 is connected between the first gate 78 of the first semiconductor switch 56 and a common rail 23.

The second controllable gate clamp 720 is connected between the second gate 76 of the second semiconductor switch 54 and the negative rail 22– of the second low-voltage DC power bus 22.

Alternatively or in addition, the second controllable gate clamp 720 is connected between the second gate 76 of the second semiconductor switch 54 and the common rail 23.

The first controllable gate clamp 710 is operable to connect the first gate 78 of the first semiconductor switch 56 to the negative rail 21– of the first low-voltage DC power bus 21 when a first control signal or gate voltage 77 that is input to the first gate 78 is less than a first threshold gate voltage.

The second controllable gate clamp 720 is operable to connect the second gate 76 of the second semiconductor switch 54 to the negative rail 22– of the second low-voltage DC power bus 22 when a second control signal or gate voltage 79 that is input to the second gate 76 is less than a second threshold gate voltage.

In one embodiment, the first and second controllable gate clamps 710, 720 include first and second semiconductor switches 711, 721, respectively.

In one embodiment, the first and second controllable gate clamps 710, 720 include first and second controlled current sources 712, 722.

In one embodiment, the first and second controllable gate clamps 710, 720 include resistors arranged in series with switches 713, 723.

In one embodiment, the first and second controllable gate clamps 710, 720 include a control switch arranged in series with switches 714, 724, and connected to the common rail 23.

In one embodiment, the first and second controllable gate clamps 710, 720 include a control switch arranged in series with switches 714, 724, and connected to the negative rail 21– of the first low-voltage DC power bus 21.

Figure 8:
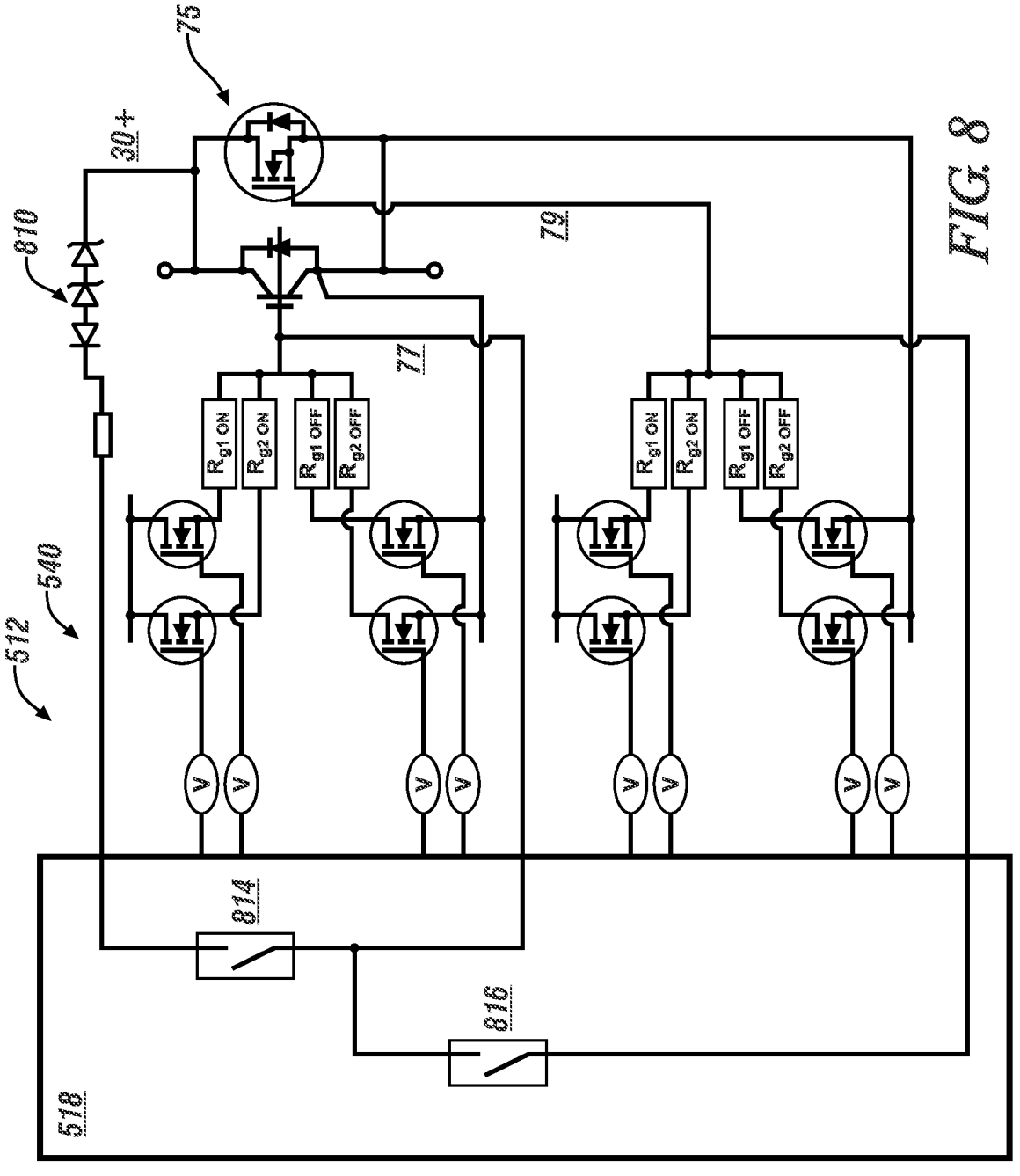
FIG. 8 schematically illustrates a partial schematic view of an embodiment of an EPS including a gate drive system, a portion of a power inverter module including a gate drive circuit, and a hybrid switch power module, in accordance with the disclosure.

FIG. 8 schematically illustrates a portion of the gate drive system 512 described with reference to FIG. 5, and the EPS 10 described with reference to FIG. 1, including a portion of one of the gate drive circuits 540 including gate driver 518. As shown, the gate driver 518 includes an overvoltage protection circuit 810. The overvoltage protection circuit 810 includes a transient voltage diode (TVS) 812, a first overvoltage switch 814, and a second overvoltage switch 816. The transient voltage diode 812 may connect between the positive HV DC power rail 30+ and the first gate 78 of the first semiconductor switch 56 via the first overvoltage switch 814 in one embodiment. The transient voltage diode 812 may also connect between the positive HV DC power rail 30+ and the second gate 76 of the second semiconductor switch 54 via the second overvoltage switch 816. Alternatively, or in addition, an embodiment of the transient voltage diode 812 may connect between the negative HV DC power rail 30– and the first gate 78 of the first semiconductor switch 56 via an embodiment of the first overvoltage switch 814. The gate driver 518 controls the first and second overvoltage switches 814, 816. The gate driver 518 has at least one pin for active clamp overvoltage protection, i.e., overvoltage across CE or DS at the transistor drain/collector inputs. The input pin on the gate driver 518 controls the first and second overvoltage switches 814, 816 to route current to the gate(s) of the semiconductor switch(es) that are operating. This ensures that the clamping energy is put into the gate of the transistor that is switching, and not being put directly into a miller clamp or the wrong switch gate. If multiple active clamps are used, the gate driver 518 have two pins, and switches on each of the pins to route current to the gate(s) corresponding to the transistor(s) under operation. By way of a non-limiting example, in a 400V system, the semiconductor switches may have a 650V rating. As such, when voltage level is greater than 750V, the transient voltage diode 812 may break down, and the overvoltage protection circuit 810 provides a controllable current path to prevent overvoltage.

Figures 1, 2, 9:
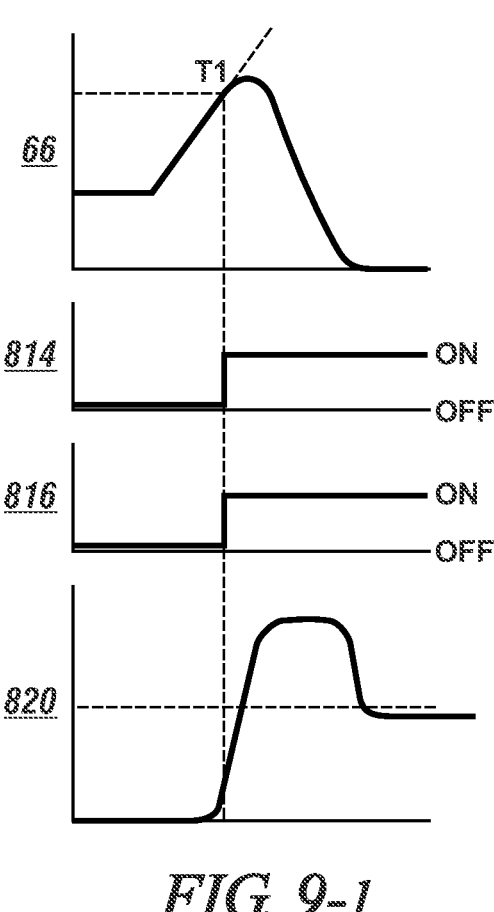

FIGS. 9-1 and 9-2 graphically illustrate operation of the overvoltage protection circuit 810 described with reference to FIG. 8, including voltage at the collector C of the first semiconductor switch 56, switch activations of the first and second overvoltage switches 814, 816, and voltage across the hybrid switch power module 75.

As shown with reference to FIG. 9-1, the voltage 66 at the collector C and drain D of the first semiconductor switch 56 is increasing, but below an overvoltage threshold, and the first and second overvoltage switches 814, 816, are deactivated. The voltage across the hybrid switch power module 75 is zero. At time T1, the voltage at the collector C of the first semiconductor switch 56 exceeds the overvoltage threshold, and both the first and second overvoltage switches 814, 816, are activated, since both the semiconductor switches are active. The voltage across the hybrid switch power module 75 initially increases, but falls to and is clamped at a voltage level that is equal to or less than a rated voltage level for the first and second semiconductor switches of the hybrid switch power module 75 As shown with reference to FIG. 9-2, the voltage 66 at the collector C of the first semiconductor switch 56 is increasing, but below an overvoltage threshold, and the first and second overvoltage switches 814, 816, are deactivated. The voltage across the hybrid switch power module 75 is zero. At time T2, the voltage at the collector C of the first semiconductor switch 56 exceeds the overvoltage threshold, and only the first overvoltage switch 814 is activated, since it is the only semiconductor switch that is active. The voltage across the hybrid switch power module 75 initially increases, but falls to and is clamped at a voltage level that is equal to or less than a rated voltage level for the first and second semiconductor switches of the hybrid switch power module 75.

Figure 10:
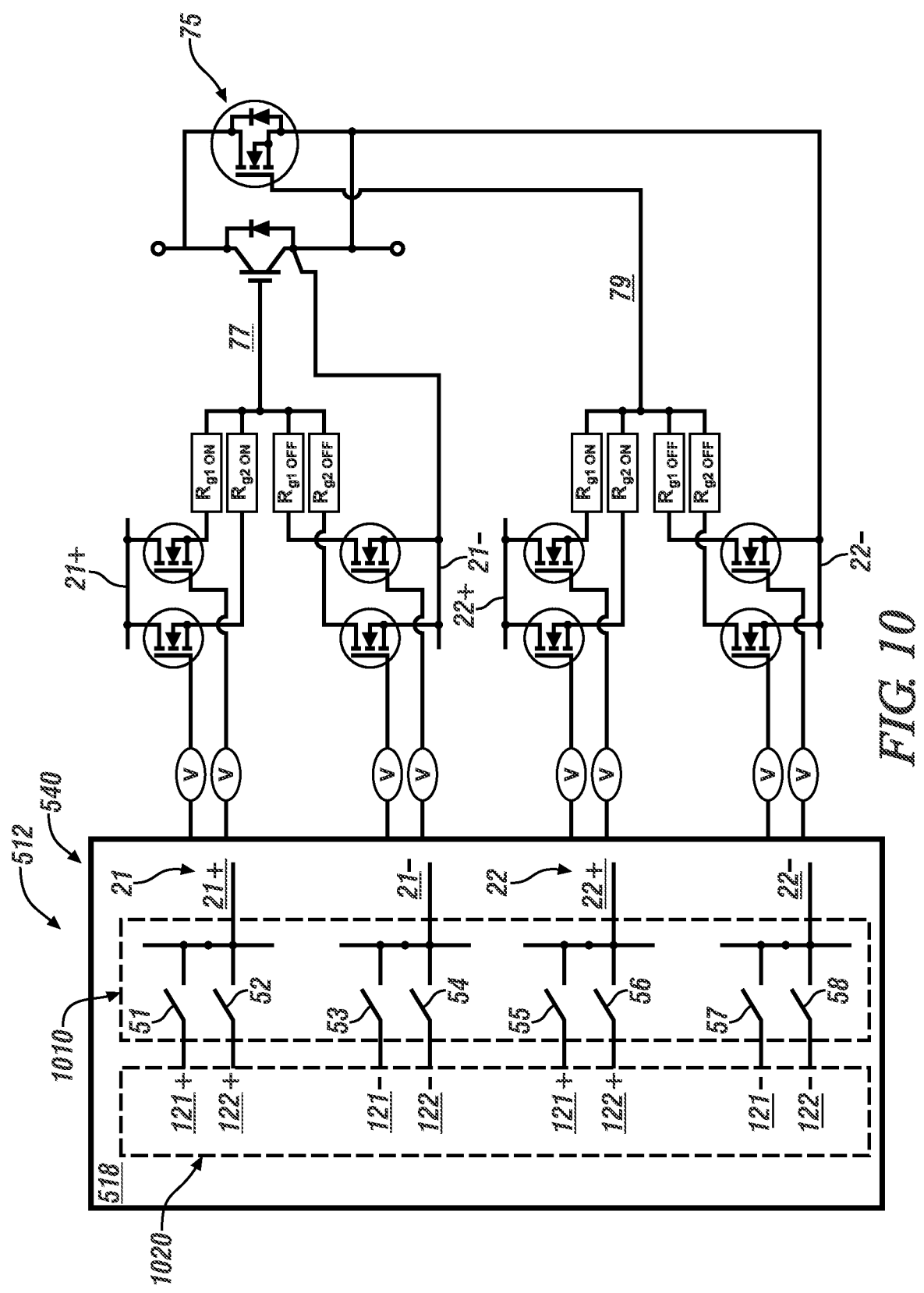
FIG. 10 schematically illustrates a partial schematic view of an embodiment of an EPS including a gate drive system, a portion of a power inverter module including a gate drive circuit, and a hybrid switch power module, in accordance with the disclosure.

FIG. 10 schematically illustrates a portion of the gate drive system 512 described with reference to FIG. 5, and the EPS 10 described with reference to FIG. 1, including a portion of one of the gate drive circuits 540 including gate driver 518. In one embodiment, the gate driver includes an internal DC power supply 1020 that is connected to a power multiplexer 1010.

The internal power supply 1020 generates first positive and negative DC voltage levels 121+, 121−, respectively, and the second positive and negative DC voltage levels 122+, 122−, respectively, which are provided as inputs to the power multiplexer 1010. Alternatively, an external power supply generates the first positive and negative DC voltage levels 121+, 121−, respectively, and the second positive and negative DC voltage levels 122+, 122−, respectively, which are provided as inputs to the power multiplexer 1010.

The power multiplexer 1010 dynamically controls the positive and negative DC voltage levels of the positive rail 21+ and negative rail 21−, respectively, of the first low voltage power bus 21, and controls the positive and negative DC voltage levels of the positive rail 22+ and negative rail

22−, respectively, of the second low voltage power bus 22 based upon combinations of the first positive and negative DC voltage levels 121+, 121−, respectively, for the first low-voltage DC power bus 21, and the second positive and negative DC voltage levels 122+, 122−, respectively, for the second low-voltage DC power bus 22. The power multiplexer 1010 is composed of four sets of complementary switch pairs S1/S2, S3/S4, S5/S6, and S7/S8. The four sets of complementary switch pairs S1/S2, S3/S4, S5/S6, and S7/S8 are complementary in that both of the switch pairs cannot be ON at the same time. When one of the switch pairs is ON, the other of the switch pairs is OFF. Both of the switch pairs can be OFF at the same time. This arrangement facilitates a multilevel turn-off of one of the semiconductor switches, e.g., an IGBT, with a larger gate bias voltage by using the gate voltage(s) of the other of the semiconductor switches as an intermediary turn off voltage during the turn off process. A soft turn off is achieved by utilizing more than 2 regulated lower gate voltages as a product of driving multiple transistor technologies together in the hybrid switch power module. The two-level turn-off is added and customized based upon which of the device or devices is experiencing a short circuit or an overcurrent condition. This feature is user configurable for various device combinations under high current operating conditions. Each soft turnoff arrangement may be configured through different parameters (i.e., intermittent voltage level, detection delay, hold time etc.).

The power multiplexer 1010 dynamically controls the positive and negative DC voltage levels of the positive rail 21+ and negative rail 21−, respectively, of the first low voltage power bus 21, and controls the positive and negative DC voltage levels of the positive rail 22+ and negative rail 22−, respectively, of the second low voltage power bus 22 to provide additional slew rate capacity to the gate driver system. The voltage magnitude between the gate driver bias supply positive and negative rails can be changed with this power multiplexer. For a fixed resistance, changing the positive and negative voltage magnitudes will change the slew rates also. This arrangement facilitates varying slew rates, and capability of additional slew rate changes.

Figures 11, 12:
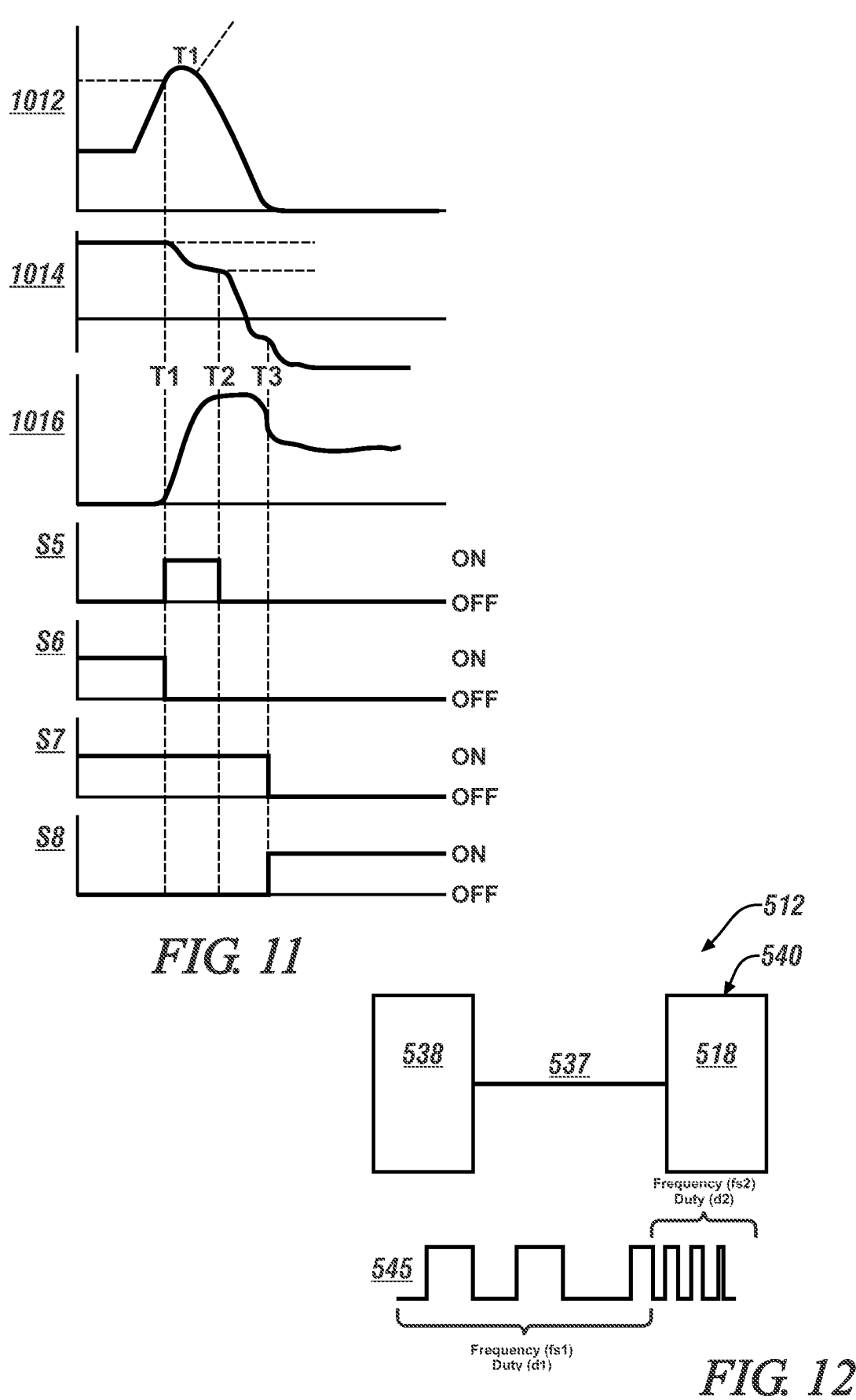
FIG. 11 graphically illustrates operation of an overvoltage protection circuit, in accordance with the disclosure.
FIG. 12 schematically illustrates a portion of a gate drive system including gate driver and gate controller, with a direct wired communication link therebetween, in accordance with the disclosure.

FIG. 11 graphically illustrates operation of the overvoltage protection circuit described with reference to FIG. 10, including voltage across the second switch 54 is shown by line 1012, Voltage Vgs 1014, Voltage Vds 1016, and switch activations of switch pairs S5/S6 and S7/S8. Initially, and during a normal operating condition, switches S6 and S7 are activated, meaning that voltage across the second low-voltage DC power bus 22 is determined by the DC voltage level of the positive rail 21+ and the DC voltage level of the negative rail 22−.

At time T1, the voltage across the second switch 54 exceeds an overcurrent or desaturation threshold, and the switch pairs S5/S6 change state, such that switch S5 is turned OFF, and switch S6 is turned ON. This allows the Voltage Vgs 1014 to decrease.

At time T2, switch S6 is turned OFF, causing the Voltage Vgs 1014 to further decrease. At time T3, switch S7 is turned OFF and switch S8 is turned ON, causing the Voltage Vds 1016 to further decrease. This arrangement facilitates intermediary voltage levels to be selected for multi-level turn off to reduce voltage overshoot and associated stress. Vgs will naturally decrease through T1-T3, however going to VG1− at time T3 provides an intermediary step down to slow down the turn off event such that the voltage overshoot rate slows such that it does not exceed the maximum rated voltage of the second switch 54, FIG. 12 schematically illustrates a portion of the gate drive system 512 described with reference to FIG. 5, including a portion of one of the gate drive circuits 540 including gate driver 518 and gate controller 538, with a direct wired communication link 537 therebetween. The gate driver 518 is arranged to communicate a plurality of parameters to the gate controller 538 via a modulated square wave 545. The modulated square wave 545 includes a frequency component and a duty cycle. The frequency is indicative of a monitored parameter of the gate drive system, e.g., the gate controller 538, the plurality of gate drive circuits 540, and the plurality of hybrid switch power modules 75, and the duty cycle is indicative of a magnitude of the monitored parameter thereof. This serves to reduce pin counts and an overall footprint of the integrated circuits.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A gate drive system for a multi-phase power inverter, comprising:

a gate controller, a gate drive circuit, and a hybrid switch power module;

wherein the hybrid switch power module is integrated into a phase leg of the multi-phase power inverter;

wherein the hybrid switch power module includes a first semiconductor switch connected in parallel with a second semiconductor switch between one of a positive high-voltage (HV) DC power rail or a negative HV DC power rail and an AC power link of the phase leg of the multi-phase power inverter, the first semiconductor switch having a first set of performance characteristics and the second semiconductor switch having a second set of performance characteristics differing at least partially from the first set of performance characteristics;

wherein the gate drive circuit includes a gate driver, a first variable resistance circuit, and a second variable resistance circuit;

the first variable resistance circuit being powered via a first low-voltage DC power bus;

the second variable resistance circuit being powered via a second low-voltage DC power bus;

wherein the first variable resistance circuit connects to a first gate of the first semiconductor switch, wherein the second variable resistance circuit connects to a second gate of the second semiconductor switch;

wherein the gate driver controls a first positive voltage level and a first negative voltage level of the first low-voltage DC power bus to control a first gate voltage that is input to the first gate of the first semiconductor switch;

wherein the gate driver controls a second positive voltage level and a second negative voltage level of the second low-voltage DC power bus to control a second gate voltage that is input to the second gate of the second semiconductor switch; and wherein the first positive voltage level differs from the second positive voltage level.

2. The gate drive system of claim 1, further comprising wherein the first negative voltage level differs from the second negative voltage level.

3. The gate drive system of claim 1, further comprising wherein the first negative voltage level is equivalent to the second negative voltage level.

4. The gate drive system of claim 1, further comprising wherein the first positive voltage level is equivalent to the second positive voltage level.

5. The gate drive system of claim 1, further comprising a first controllable gate clamp, wherein the first controllable gate clamp is connected between the first gate of the first semiconductor switch and a negative rail of the first low-voltage DC power bus;

wherein the first controllable gate clamp is operable to connect the first gate of the first semiconductor switch to the negative rail of the first low-voltage DC power bus when a first control signal that is input to the first gate is less than a first threshold gate voltage.

6. The gate drive system of claim 5, further comprising a second controllable gate clamp, wherein the second controllable gate clamp is connected between the second gate of the second semiconductor switch and a negative rail of the second low-voltage DC power bus;

wherein the second controllable gate clamp is operable to connect the second gate of the second semiconductor switch to the negative rail of the second low-voltage DC power bus when a second control signal that is input to the second gate is less than a second threshold gate voltage.

7. The gate drive system of claim 5, wherein the first controllable gate clamp comprises at least one of a semiconductor switch, a resistor arranged in series with a switch, or a controlled current source arranged in series with a switch.

8. The gate drive system of claim 1, further comprising a first controllable gate clamp, wherein the first controllable gate clamp is connected between the first gate of the first semiconductor switch and a common rail;

wherein the first controllable gate clamp is operable to connect the first gate of the first semiconductor switch to the common rail when a first control signal that is input to the first gate is less than a first threshold gate voltage.

9. The gate drive system of claim 1, further comprising a second controllable gate clamp, wherein the second controllable gate clamp is connected between the second gate of the second semiconductor switch and a common rail;

wherein the second controllable gate clamp is operable to connect the second gate of the second semiconductor switch to the common rail when a second control signal that is input to the second gate is less than a second threshold gate voltage.

10. The gate drive system of claim 1, further comprising an overvoltage protection circuit, the overvoltage protection circuit including a transient voltage diode, a first overvoltage switch, and a second overvoltage switch;

wherein the transient voltage diode connects between the positive HV DC power rail and the first gate of the first semiconductor switch via the first overvoltage switch;

wherein the transient voltage diode connects between the positive HV DC power rail and the second gate of the second semiconductor switch via the second overvoltage switch; and wherein the gate driver selectively activates the first and second overvoltage switches in response to an overvoltage condition at one of the first semiconductor switch and the second semiconductor switch.

11. The gate drive system of claim 1, further comprising a data communication link arranged between the gate drive and the gate controller;

wherein the gate drive is arranged to communicate a plurality of parameters to the gate controller via a modulated square wave;

wherein the modulated square wave includes a frequency and a duty cycle;

wherein the frequency is indicative of a monitored parameter of the hybrid switch power module, and wherein the duty cycle is indicative of a magnitude of the monitored parameter of the hybrid switch power module.

12. The gate drive system of claim 1, further comprising a power multiplexer and a power supply being arranged in the gate driver;

wherein the power multiplexer includes a plurality of complementary switch pairs arranged between the power supply, the positive rail and the negative rail of the first low voltage power bus, and the positive rail and the negative rail of the second low voltage power bus;

wherein the gate driver controls the plurality of complementary switch pairs to control the positive and negative DC voltage levels of the first low-voltage power bus, and to control the positive and negative DC voltage levels of the second low-voltage power bus.

13. A gate drive system for a multi-phase power inverter, comprising:

a gate controller, a gate drive circuit, and a hybrid switch power module;

wherein the hybrid switch power module is arranged between one of a positive high-voltage (HV) DC power rail or a negative HV DC power rail and an AC power link coupled to the multi-phase power inverter;

wherein the hybrid switch power module includes a first semiconductor switch connected in parallel with a second semiconductor switch;

wherein the first semiconductor switch has a first performance characteristic;

wherein the second semiconductor switch has a second performance characteristic;

wherein the first performance characteristic differs from the second performance characteristic;

wherein the gate drive circuit includes a gate driver, a first variable resistance circuit, and a second variable resistance circuit;

the first variable resistance circuit being powered via a first low-voltage DC power bus;

the second variable resistance circuit being powered via a second low-voltage DC power bus;

wherein the first variable resistance circuit connects to a first gate of the first semiconductor switch, wherein the second variable resistance circuit connects to a second gate of the second semiconductor switch;

wherein the gate driver controls a first positive voltage level and a first negative voltage level of the first low-voltage DC power bus to control a first gate voltage that is input to first gate of the first semiconductor switch;

wherein the first positive voltage level and the first negative voltage level at the first gate of the first semiconductor switch are determined based upon the first performance characteristic;

wherein the gate driver controls a second positive voltage level and a second negative voltage level of the second low-voltage DC power bus to control a second gate voltage that is input to the second gate of the second semiconductor switch; and wherein the second positive voltage level and the second negative voltage level at the second gate of the second semiconductor switch are determined based upon the second performance characteristic.

14. The gate drive system of claim 13, further comprising:
wherein the first gate voltage of the first semiconductor switch differs from the second gate voltage of the second semiconductor switch.

15. The gate drive system of claim 14, further comprising:
wherein the first negative voltage level at the first gate of the first semiconductor switch differs from the second negative voltage level at the second gate of the second semiconductor switch.

16. The gate drive system of claim 13, further comprising a first controllable gate clamp, wherein the first controllable gate clamp is connected between the first gate of the first semiconductor switch and a negative rail of the first low-voltage DC power bus;

wherein the first controllable gate clamp is operable to connect the first gate of the first semiconductor switch to the negative rail of the first low-voltage DC power bus when a first control signal that is input to the first gate is less than a first threshold gate voltage.

17. The gate drive system of claim 16, further comprising a second controllable gate clamp, wherein the second controllable gate clamp is connected between the second gate of the second semiconductor switch and a negative rail of the second low-voltage DC power bus;

wherein the second controllable gate clamp is operable to connect the second gate of the second semiconductor switch to the negative rail of the second low-voltage DC power bus when a second control signal that is input to the second gate is less than a second threshold gate voltage.

18. The gate drive system of claim 13, further comprising an overvoltage protection circuit, the overvoltage protection circuit including a transient voltage diode, a first overvoltage switch, and a second overvoltage switch;

wherein the transient voltage diode connects between the positive HV DC power rail and the first gate of the first semiconductor switch via the first overvoltage switch;

wherein the transient voltage diode connects between the positive HV DC power rail and the second gate of the second semiconductor switch via the second overvoltage switch; and wherein the gate driver selectively activates the first and second overvoltage switches in response to an overvoltage condition at one of the first semiconductor switch and the second semiconductor switch.

19. The gate drive system of claim 13, further comprising a power multiplexer and a power supply being arranged in the gate driver;

wherein the power multiplexer includes a plurality of complementary switch pairs arranged between the power supply, the positive rail and the negative rail of the first low voltage power bus, and the positive rail and the negative rail of the second low voltage power bus; and wherein the gate driver controls the plurality of complementary switch pairs to control the positive and negative DC voltage levels of the first low-voltage power bus, and to control the positive and negative DC voltage levels of the second low-voltage power bus.

20. An electrified vehicle system, comprising:

a gate drive system, a multi-phase power inverter, and an electric machine;

the multi-phase power inverter being operatively connected to the electric machine via a plurality of phase legs;

the gate drive system including a gate controller, a gate drive circuit, and a plurality of hybrid switch power modules;

wherein the plurality of hybrid switch power modules are electrically coupled to the plurality of phase legs of the multi-phase power inverter;

wherein each of the plurality of hybrid switch power modules includes a first semiconductor switch connected in parallel with a second semiconductor switch between one of a positive high-voltage (HV) DC power rail or a negative HV DC power rail and one of the plurality of phase legs of the multi-phase power inverter, the first semiconductor switch having a first set of performance characteristics and the second semiconductor switch having a second set of performance characteristics differing at least partially from the first set of performance characteristics;

wherein the gate drive circuit includes a gate driver, a first variable resistance circuit, and a second variable resistance circuit;

the first variable resistance circuit being powered via a first low-voltage DC power bus;

the second variable resistance circuit being powered via a second low-voltage DC power bus;

wherein the first variable resistance circuit connects to a first gate of the first semiconductor switch, wherein the second variable resistance circuit connects to a second gate of the second semiconductor switch;

wherein the gate driver controls a first positive voltage level and a first negative voltage level of the first low-voltage DC power bus to control at least one of a first positive voltage level and a first negative voltage level at the first gate of the first semiconductor switch;

wherein the gate driver controls a second positive voltage level and a second negative voltage level of the second low-voltage DC power bus to control at least one of a second positive voltage level and a second negative voltage level at the second gate of the second semiconductor switch; and wherein the first positive voltage level at the first gate of the first semiconductor switch differs from the second positive voltage level at the second gate of the second semiconductor switch.

* * * * *